United States Patent
Kumar et al.

(10) Patent No.: US 11,592,633 B2
(45) Date of Patent: Feb. 28, 2023

(54) DUAL LAYER BUFFER TUBE

(71) Applicant: Sterlite Technologies Limited, Gurgaon (IN)

(72) Inventors: Sravan Kumar, Gurgaon (IN); Hemanth Kondapalli, Gurgaon (IN); Kishore Chandra Sahoo, Gurgaon (IN)

(73) Assignee: Sterlite Technologies Limited, Gurgaon (IN)

( * ) Notice: Subject to any disclaimer, the term of this patent is extended or adjusted under 35 U.S.C. 154(b) by 0 days.

(21) Appl. No.: 16/803,070

(22) Filed: Feb. 27, 2020

(65) Prior Publication Data

US 2021/0072475 A1 Mar. 11, 2021

(30) Foreign Application Priority Data

Sep. 5, 2019 (IN) .............................. 201911035840

(51) Int. Cl.
*G02B 6/44* (2006.01)

(52) U.S. Cl.
CPC .................................... *G02B 6/443* (2013.01)

(58) Field of Classification Search
None
See application file for complete search history.

(56) References Cited

U.S. PATENT DOCUMENTS

| | | | | |
|---|---|---|---|---|
| 4,664,472 A * | 5/1987 | Mayr | .................. | G02B 6/4486 385/109 |
| 5,201,020 A * | 4/1993 | Kannabiran | ......... | G02B 6/4432 385/113 |
| 5,566,266 A * | 10/1996 | Nave | .................... | G02B 6/4411 285/95 |
| 2003/0099446 A1* | 5/2003 | Witt | ..................... | G02B 6/4495 385/109 |
| 2005/0281517 A1* | 12/2005 | Wessels, Jr. | ......... | G02B 6/4429 385/109 |
| 2011/0245807 A1* | 10/2011 | Sakata | .............. | A61M 25/0012 604/526 |
| 2017/0146756 A1* | 5/2017 | Baca | .................... | G02B 6/4434 |
| 2019/0113701 A1* | 4/2019 | Murthy | ............... | G02B 6/4494 |

* cited by examiner

*Primary Examiner* — Michael Stahl
(74) *Attorney, Agent, or Firm* — Steven R. Fairchild; Michael J. Pennington

(57) ABSTRACT

A buffer tube for an optical fiber cable provided by the present disclosure includes an optical fiber ribbon stack, a first layer, a second layer, an optical fiber cable, a central strength member, a plurality of buffer tubes, a water blocking layer, and a sheath and plurality of rip cords. The first layer is an inner layer of the buffer tube. The first layer is made of a soft material. The soft material of the first layer is one of low smoke zero halogen, thermoplastic elastomers and thermoplastic polyurethane. The second layer is an outer layer of the buffer tube. The second layer surrounds the first layer. The second layer is made of a hard material. The hard material of the second layer is one of polypropylene, polybutylene terephthalate, and nylon.

16 Claims, 3 Drawing Sheets

DUAL LAYER BUFFER TUBE

TECHNICAL FIELD

The present disclosure relates to the field of optical fiber and, in particular, relates to a dual layer buffer tube. The present application is based on, and claims priority from an Indian Application Number 201911035840 filed on 5 Sep. 2019, the disclosure of which is hereby incorporated by reference herein.

BACKGROUND

In the present scenario, optical fiber cables have secured an important position in building network of modern communication systems across the world. The optical fiber cables are sensitive to conditions like crushes, kinks, bends and presence of water and/or moisture. Specifically, the ingression of water and other waste in due course of time degrade or destroy the optical fiber cables. Traditionally, optical fiber cables include a buffer tube that encloses a plurality of optical fibers ribbons in the buffer tube. The buffer tube protects the plurality of optical fiber ribbons from physical damage. Conventionally, the buffer tube is made of Polybutylene Terephthalate (PBT) or Polypropylene (PP) or High-density polyethylene (HDPE) material with sufficient spaces between the plurality of optical fiber ribbons and inner diameter of the buffer tube. This leads to increase in the overall diameter of the buffer tube. In addition, the buffer tube with large diameter makes the optical fiber cable bulky. However, if distance between the buffer tube and the plurality of optical fiber ribbons decreases, the overall diameter of the buffer tube decreases but attenuation increases. Further, this leads to increase in data transmission losses especially in high fiber count cables.

In light of the foregoing discussion, there is a need for a buffer tube that overcomes the above cited drawbacks of conventionally known buffer tubes.

BRIEF SUMMARY OF THE INVENTION

The present disclosure provides a buffer tube for an optical fiber cable. The buffer tube includes a first layer. In addition, the buffer tube includes a second layer. The first layer is an inner layer of the buffer tube. Further, the first layer is made of a soft material. Furthermore, the second layer is an outer layer of the buffer tube. Moreover, the second layer surrounds the first layer. The second layer is made of a hard material.

A primary object of the disclosure is to provide a dual layer buffer tube having high fiber count for installation in optical fiber cables.

Another object of the present disclosure is to provide the dual layer buffer tube with a compact structure.

Another object of the present disclosure is to provide the dual layer buffer tube to withstand crush when rolled inside any optical fiber cable.

Yet another object of the present disclosure is to provide the dual layer buffer tube to reduce attenuation losses.

Yet another object of the present disclosure is to provide the dual layer buffer tube to protect from mechanical stresses and environmental stresses.

Yet another object of the present disclosure is to reduce diameter of the dual layer buffer tube even with high fiber count.

In an embodiment of the present disclosure, the soft material of the first layer is one of low smoke zero halogen, thermoplastic elastomers and thermoplastic polyurethane.

In an embodiment of the present disclosure, the hard material of the second layer is one of polypropylene, polybutylene terephthalate, and nylon.

In an embodiment of the present disclosure, the buffer tube includes an optical fiber ribbon stack. In addition, the optical fiber ribbon stack is efficiently packed inside the buffer tube. Further, the optical fiber ribbon stack includes a plurality of optical fiber ribbons. Furthermore, each of the plurality of optical fiber ribbons of the optical fiber ribbon stack includes a plurality of optical fibers.

In an embodiment of the present disclosure, the first layer is characterized by shore hardness. In addition, shore hardness of the first layer is in range of about 20 shore D to 40 shore D.

In an embodiment of the present disclosure, the second layer is characterized by shore hardness. In addition, shore hardness of the second layer is in range of about 40 shore D to 80 shore D.

In an embodiment of the present disclosure, the first layer of the buffer tube reduces stress on the plurality of optical fibers. In addition, the first layer reduces micro bend losses on the plurality of optical fibers.

In an embodiment of the present disclosure, the first layer of the buffer tube is characterized by thickness. In addition, thickness of the first layer is in range of about 0.1 millimetre to 0.4 millimetre.

In an embodiment of the present disclosure, the second layer is characterized by high crush resistance. In addition, high crush resistance sustains compressive tension and stress on the optical fiber cable.

In an embodiment of the present disclosure, the second layer is characterized by crush resistance of about 700 Newton per 10 centimetres.

In an embodiment of the present disclosure, the second layer of the buffer tube is characterized by thickness in range of about 0.2 millimetre to 0.5 millimetre.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
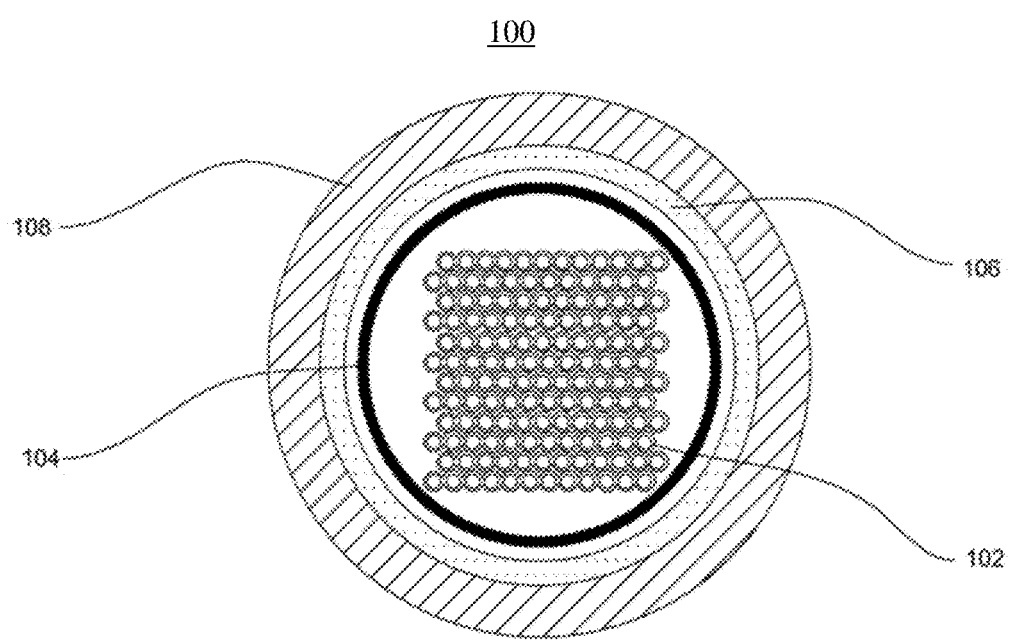
FIG. 1 illustrates a buffer tube enclosing an optical fiber ribbon stack, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

REFERENCE NUMERALS IN THE DRAWINGS: For a more complete understanding of the present invention parts, reference is now made to the following descriptions:
- 100. Buffer tube.
- 102. Optical fiber ribbon stack.
- 104. Water blocking tape.
- 106. The first layer.
- 108. The second layer.
- 200. Buffer tube.
- 202. Optical fiber ribbon stack.
- 204. The first layer.
- 206. The second layer.
- 300. Optical fiber cable.
- 302. Central strength member.
- 304. Plurality of buffer tubes.
- 306. Water blocking layer.
- 308. Sheath.
- 310. Plurality of rip cords.

Referring to FIG. 1, this is a buffer tube 100 enclosing an optical fiber ribbon stack 102, in accordance with various embodiments of the present disclosure. In general, the buffer tubes 100 provide mechanical isolation to fibers present in the buffer tubes 100. In general, optical fiber ribbon stacks 102 include number of optical fiber ribbons arranged together with matrix material. The buffer tube 100 is a dual layer buffer tube that provides low attenuation when installed in any optical fiber cable. The buffer tube 100 includes the optical fiber ribbon stack 102, a water blocking tape 104, a first layer 106 and a second layer 108. In an embodiment of the present disclosure, the buffer tube 100 is a loose tube. In addition, the loose tube has a compact configuration.

The buffer tube 100 includes the optical fiber ribbon stack 102. Further, the optical fiber ribbon stack 102 includes a plurality of optical fiber ribbons. In general, optical fiber ribbons are made of number of optical fibers bonded together. In an embodiment of the present disclosure, each optical fiber ribbon of the plurality of optical fiber ribbons in the optical fiber ribbon stack 102 is a flexible ribbon. In general, flexible ribbons are capable to bend along non-preferential axis. In an embodiment of the present disclosure, number of the plurality of optical fiber ribbons of the optical fiber ribbon stack 102 inside the buffer tube 100 is about 12. In another embodiment of the present disclosure, number of the plurality of optical fiber ribbons of the optical fiber ribbon stack 102 may vary. In an embodiment of the present disclosure, the optical fiber ribbon stack 102 has a compact structure. In addition, the compact structure of the optical fiber ribbon stack 102 states that the plurality of optical fiber ribbons of the optical fiber ribbon stack 102 is closely and neatly packed together.

In an embodiment of the present disclosure, the optical fiber ribbon stack 102 is efficiently packed inside the buffer tube 100. The efficient packing of the optical fiber ribbon stack 102 inside the buffer tube 100 reduces overall diameter of any cable during installation of the buffer tube 100 in particular cable. In addition, the efficient packing of the optical fiber ribbon stack 102 inside the buffer tube 100 reduces attenuation losses. Further, each of the plurality of optical fiber ribbons of the optical fiber ribbon stack 102 includes a plurality of optical fibers. In an embodiment of the present disclosure, number of the plurality of optical fibers in each optical fiber ribbon of the plurality of optical fiber ribbons is 12. In another embodiment of the present disclosure, number of the plurality of optical fibers in each optical fiber ribbon of the plurality of optical fiber ribbons may vary. In an embodiment of the present disclosure, total number of the plurality of optical fibers in the buffer tube 100 is 144. In another embodiment of the present disclosure, total number of the plurality of optical fibers may vary.

The buffer tube 100 includes the water blocking tape 104. In general, water blocking tape 104 is designed to block ingression of water inside optical fiber cables. In an embodiment of the present disclosure, the water blocking tape 104 prevents ingression of water and moisture inside the buffer tube 100. The water blocking tape 104 surrounds the optical fiber ribbon stack 102

Further, the buffer tube 100 includes the first layer 106. The first layer 106 is an inner layer of the buffer tube 100. The first layer 106 surrounds the water blocking tape 104. In an embodiment of the present disclosure, the first layer 106 includes but may not be limited to low smoke zero halogen, thermoplastic elastomers, and thermoplastic polyurethane. In an embodiment of the present disclosure, the first layer 106 is made of soft thermoplastic material. In another embodiment of the present disclosure, the first layer 106 is made of any suitable material of the like. In general, thermoplastic materials are easy to mold and provides high strength. In addition, thermoplastic materials may be recycled easily without any damage. Also, thermoplastic materials are chemically retardant. In an embodiment of the present disclosure, the soft thermoplastic material of the first layer 106 of the buffer tube 100 reduces stress on the plurality of optical fibers. In an embodiment of the present disclosure, the soft thermoplastic material includes low-density polyethylene, thermoplastic elastomers, thermoplastic polyurethane and the like. The first layer 106 is characterized by thickness. In an embodiment of the present disclosure, the first layer 106 has thickness in range of about 0.1 millimetre to 0.4 millimetre. In another embodiment of the present disclosure, thickness of the first layer 106 may vary.

In addition, the first layer 106 is characterized by shore hardness. In general, shore hardness is measure of resistance of material to penetration of spring loaded needle-like indenter. In addition, shore hardness is tested with instrument called durometer. Further, shore hardness of thermoplastic materials is measured with shore D scale. In an embodiment of the present disclosure, shore hardness of the first layer 106 is in range of about 20 shore D to 40 shore D. In another embodiment of the present disclosure, the range of shore hardness of the first layer 106 may vary.

The buffer tube 100 includes the second layer 108. The second layer is an outer layer of the buffer tube 100. In addition, the second layer 108 surrounds the first layer 106. In an embodiment of the present disclosure, the second layer 108 has thickness in range of about 0.2 millimetre to 0.5 millimetre. In another embodiment of the present disclosure, thickness of the second layer 108 may vary. In an embodiment of the present disclosure, the second layer 108 is made of hard thermoplastic material. In addition, the hard thermoplastic material includes but may not be limited to polypropylene, polybutylene terephthalate and nylon. In another embodiment of the present disclosure, the second layer 108 is made of any suitable material of the like. In an embodiment of the present disclosure, hard thermoplastic material of the second layer 108 has high crush resistance. In general, crush resistance is ability to withstand crush. In an embodiment of the present disclosure, the second layer 108 has crush resistance of about 700 Newton per 10 centimetres. In another embodiment of the present disclosure, crush resistance of the second layer 108 may vary. Further, the second layer 108 is characterized by shore hardness. In an embodiment of the present disclosure, the shore hardness of the second layer 108 is in range of about 40 shore D to 80 shore D. In another embodiment of the present disclosure, the range of shore hardness of the second layer 108 may vary.

The buffer tube 100 has small diameter. In an embodiment of the present disclosure, the buffer tube 100 is characterized by a first diameter and a second diameter. The first diameter corresponds to an inner diameter of the buffer tube 100 and the second diameter corresponds to an outer diameter of the buffer tube 100. In an embodiment of the present disclosure, the inner diameter of the buffer tube 100 is about 4.2 millimetre. In another embodiment of the present disclosure, the inner diameter of the buffer tube 100 may vary. The outer diameter of the buffer tube 100 is about 5.2 millimetre. In an embodiment of the present disclosure, the outer diameter of the buffer tube 100 may vary. Further, the buffer tube 100 provides high data transmission.

In an embodiment of the present disclosure, the buffer tube 100 may be installed in any type of optical fiber cable. In general, types of optical fiber cable include armored optical fiber cable, fire retardant optical fiber cable, multi-loose tube optical fiber cable, high density optical fiber cable and the like.

Figure 2:
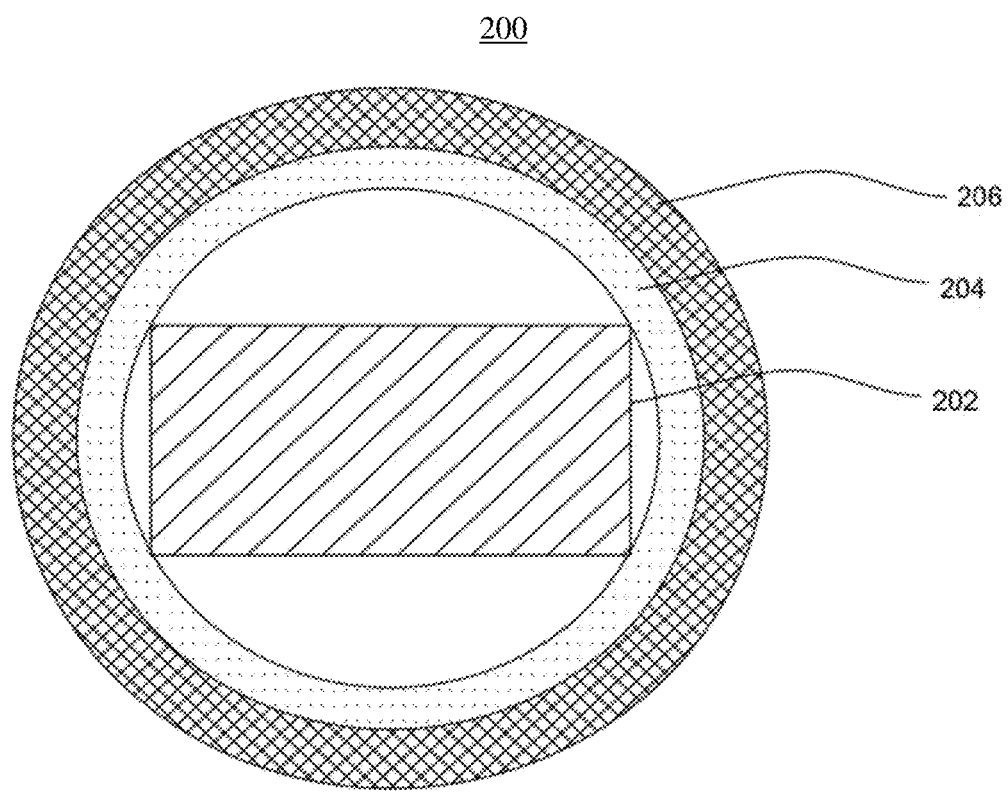
FIG. 2 illustrates the buffer tube enclosing the optical fiber ribbon stack, in accordance with various embodiments of the present disclosure.

Referring to FIG. 2, this is the buffer tube 200 enclosing the optical fiber ribbon stack 202, in accordance with various embodiments of the present disclosure. In general, buffer tubes 200 provide mechanical isolation to fibers present in buffer tubes. In general, optical fiber ribbon stacks include number of optical fiber ribbons arranged together with matrix material. The buffer tube 200 is the dual layer buffer tube. The buffer tube 200 includes the optical fiber ribbon stack 202, the first layer 204 and the second layer 206. In an embodiment of the present disclosure, the buffer tube 200 is the loose tube.

The buffer tube 200 includes the optical fiber ribbon stack 202. Further, the optical fiber ribbon stack 202 includes the plurality of optical fiber ribbons. In general, optical fiber ribbons are made of number of optical fibers bonded together. In an embodiment of the present disclosure, each optical fiber ribbon of the plurality of optical fiber ribbons in the optical fiber ribbon stack 202 is the flexible ribbon. In general, flexible ribbons are capable to bend along non-preferential axis. In an embodiment of the present disclosure, the optical fiber ribbon stack 202 has the compact structure. In addition, the compact structure of the optical fiber ribbon stack 202 states that the plurality of optical fiber ribbons of the optical fiber ribbon stack 202 is closely and neatly packed together.

In an embodiment of the present disclosure, the optical fiber ribbon stack 202 is efficiently packed inside the buffer tube 200 in shape of a rectangle. In another embodiment of the present disclosure, the optical fiber ribbon stack 202 is efficiently packed inside the buffer tube 200 in shape of a square. In yet another embodiment of the present disclosure, the optical fiber ribbon stack 202 may be efficiently packed inside the buffer tube 200 in any other shape of the like. The efficient packing of the optical fiber ribbon stack 202 inside the buffer tube 200 reduces overall diameter of any cable during installation of the buffer tube 200 in particular cable. In addition, the efficient packing of the optical fiber ribbon stack 202 inside the buffer tube 200 reduces attenuation losses. Further, each of the plurality of optical fiber ribbons of the optical fiber ribbon stack 202 includes the plurality of optical fibers.

Further, the buffer tube 200 includes the first layer 204. The first layer 204 is the inner layer of the buffer tube 200. The first layer 204 surrounds the optical fiber ribbon stack 202. In an embodiment of the present disclosure, the first layer 204 has thickness of about 0.1 millimetre to 0.4 millimetre. In an embodiment of the present disclosure, thickness of the first layer 204 may vary. In an embodiment of the present disclosure, the first layer 204 is made of one of soft thermoplastic material or elastomer material. In another embodiment of the present disclosure, the first layer 204 is made of any suitable material of the like. In addition, the soft thermoplastic material or elastomer material of the first layer 204 of the buffer tube 200 reduces stress on the plurality of optical fibers.

Furthermore, the buffer tube 200 includes the second layer 206. The second layer 206 is the outer layer of the buffer tube 200. In addition, the second layer 206 surrounds the first layer 204. In an embodiment of the present disclosure, the second layer 206 has thickness of about 0.2 millimetre to 0.5 millimetre. In an embodiment of the present disclosure, the thickness of the second layer 206 may vary. In an embodiment of the present disclosure, the second layer 206 is made of hard thermoplastic material. In general, thermoplastic materials are easy to mold and provides high strength. In addition, thermoplastic materials may be recycled easily without any damage. Also, thermoplastic materials are chemically retardant. In another embodiment of the present disclosure, the second layer 106 is made of any suitable material of the like. In an embodiment of the present disclosure, hard thermoplastic material of the second layer 206 has high crush resistance. In general, crush resistance is ability to withstand crush. In an embodiment of the present disclosure, the second layer 206 has crush resistance of about 700 Newton per 10 centimetres. In another embodiment of the present disclosure, crush resistance of the second layer 206 may vary.

The buffer tube 200 has small diameter. In an embodiment of the present disclosure, the buffer tube 200 is characterized by the first diameter and the second diameter. The first diameter corresponds to the inner diameter of the buffer tube 200 and the second diameter corresponds to the outer diameter of the buffer tube 200. The inner diameter of the buffer tube 200 is about 4.2 millimetres. In an embodiment of the present disclosure, the inner diameter of the buffer tube 200 may vary. The outer diameter of the buffer tube 200 is about 5.2 millimetres. In an embodiment of the present disclosure, the outer diameter of the buffer tube 200 may vary. In an embodiment of the present disclosure, the diameter of the buffer tube 200 varies according to the fiber count per tube. The buffer tube 200 may or may not reduce the overall cable diameter. The dual layer nature of the buffer tube 200 helps improve the optical performance of an optical fiber cable containing the buffer tube 200 of the present disclosure. Further, the buffer tube 200 provides high rate of data transmission. In an embodiment of the present disclosure, high rate of data transmission depends on modulation technique used and latency factors.

Figure 3:
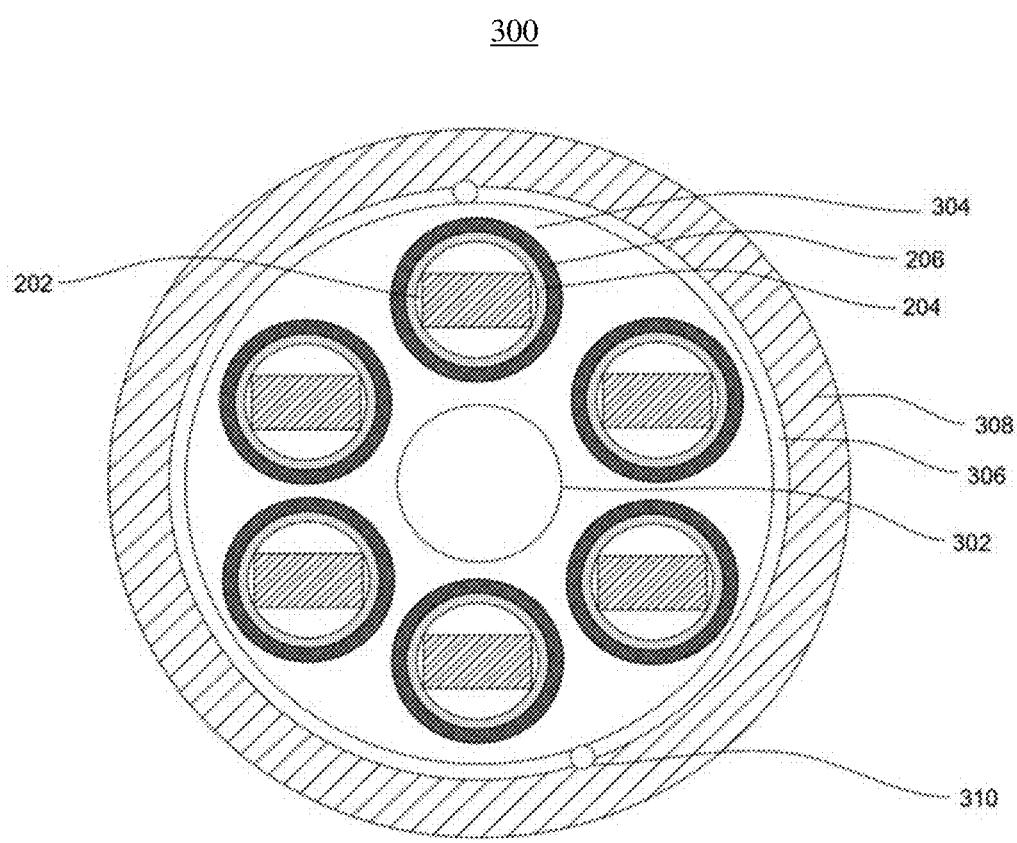
FIG. 3 illustrates an example of an optical fiber cable with the buffer tube of FIG. 2, in accordance with an embodiment of the present disclosure.

Referring to FIG. 3, this s an example of the optical fiber cable 300 with the buffer tube 200 of FIG. 1, in accordance with an embodiment of the present disclosure. The optical fiber cable 300 includes a central strength member 302, a plurality of buffer tubes 304, a water blocking layer 306 and a sheath 308. In addition, the optical fiber cable 200 includes a plurality of rip cords 310.

The optical fiber cable 300 includes the central strength member 302. In general, central strength member provides physical strength to a fiber cable and resists over bending of the fiber cable. In an embodiment of the present disclosure, the central strength member 302 provides tensile strength to the optical fiber cable 300.

Further, the optical fiber cable 300 includes the plurality of buffer tubes 204. Each of the plurality of buffer tubes 304 is the buffer tube 200 of FIG. 2. The plurality of buffer tubes 304 surrounds the central strength member 302. Furthermore, each of the plurality of buffer tubes 304 provides protection to the optical fiber ribbon stack 202 (as shown in FIG. 2) from physical damage. In an embodiment of the present disclosure, cross section of each buffer tube 200 of the plurality of buffer tubes 304 is circular in shape. In another embodiment of the present disclosure, shape of the plurality of buffer tubes 304 may vary. In an embodiment of the present disclosure, each buffer tube 200 of the plurality of buffer tubes 304 is similar in structure and dimensions. In addition, each buffer tube 200 of the plurality of buffer tubes 304 is characterized by the first diameter and the second diameter. The first diameter corresponds to the inner diameter and the second diameter corresponds to the outer diameter of each buffer tube 300 of the plurality of buffer tubes 304. In an embodiment of the present disclosure, the inner diameter of each buffer tube 200 of the plurality of buffer tubes 304 is about 4.2 millimetres. In another embodiment of the present disclosure, the inner diameter of each buffer tube 200 of the plurality of buffer tubes 304 may vary. In an embodiment of the present disclosure, the outer diameter of each buffer tube 200 of the plurality of buffer tubes 304 is about 5.2 millimetres. In another embodiment of the present disclosure, the outer diameter of each buffer tube 200 of the plurality of buffer tubes 304 may vary.

Furthermore, the optical fiber cable 300 includes the water blocking layer 306. The water blocking layer 306 includes one or more binders and a water blocking tape. In general, the water blocking tape is designed to block ingression of water inside optical fiber cables. In an embodiment of the present disclosure, the water blocking layer 306 prevents ingression of water and moisture inside the optical fiber cable 300. The water blocking layer 306 surrounds the plurality of buffer tubes 304. Moreover, the optical fiber cable 300 includes the sheath 308. The sheath 308 surrounds the water blocking layer 306. The sheath 308 is a jacket layer. In an embodiment of the present disclosure, the sheath 308 protects the optical fiber cable 300 against crush, pressure and tensile stress. In addition, the sheath 308 provides stiffness, rigidity, and resistance to the optical fiber cable 300.

Also, the optical fiber cable 300 includes the plurality of rip cords 310. In an embodiment of the present disclosure, the plurality of rip cords 310 is positioned diametrically opposite in between the water blocking layer 306 and the sheath 308. In another embodiment of the present disclosure, position of the plurality of rip cords 310 may vary. The plurality of rip cords 310 facilitates stripping of the sheath 308. In an embodiment of the present disclosure, each of the plurality of rip cords 310 has a circular cross-section. In an embodiment of the present disclosure, number of the plurality of rip cords 310 is 2. In another embodiment of the present disclosure, number of the plurality of rip cords 310 may vary.

In an embodiment of the present disclosure, each buffer tube 200 of the plurality of buffer tubes 304 may be installed in any type of optical fiber cable. In general, types of optical fiber cable include armored optical fiber cable, fire retardant optical fiber cable, multi-loose tube optical fiber cable, high density optical fiber cable and the like. In addition, types of optical fiber cable include optical fiber cable with central strength member and optical fiber cable without central strength member.

The buffer tube of the present disclosure offers number of advantages over the conventional buffer tubes in the prior art. The buffer tube of the current disclosure is dual layer buffer tube that provides low attenuation when installed in any optical fiber cable. In addition, the buffer tube provides improved optical performances in compact structure ribbon cables. Further, the buffer tube has high fiber count with reduced diameter. Furthermore, the buffer tube provides high data transmission rates.

Although, the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What we claim is:

1. A buffer tube for an optical fiber cable, comprising:
   a first layer, wherein the first layer is an inner layer of the buffer tube, wherein the first layer is made of a soft material; and
   a second layer, wherein the second layer is an outer layer of the buffer tube, wherein the second layer surrounds the first layer, wherein the second layer is made of a hard material, wherein the second layer is characterized by crush resistance of 700 Newton per 10 centimetres.

2. The buffer tube as claimed in claim 1, wherein the soft material of the first layer is one of low smoke zero halogen, thermoplastic elastomers and thermoplastic polyurethane.

3. The buffer tube as claimed in claim 1, wherein the hard material of the second layer is one of polypropylene, polybutylene terephthalate, and nylon.

4. The buffer tube as claimed in claim 1, wherein the buffer tube further comprises an optical fiber ribbon stack, wherein the optical fiber ribbon stack is packed inside the buffer tube, wherein the optical fiber ribbon stack comprises a plurality of optical fiber ribbons, wherein each of the optical fiber ribbon of the optical fiber ribbon stack comprises a plurality of optical fibers.

5. The buffer tube as claimed in claim 1, wherein the first layer is characterized by shore hardness, wherein shore hardness of the first layer is in a range of 20 shore D to 40 shore D.

6. The buffer tube as claimed in claim 1, wherein the second layer is characterized by shore hardness, wherein shore hardness of the second layer is in a range of 40 shore D to 80 shore D.

7. The buffer tube as claimed in claim 1, wherein the first layer of the buffer tube reduces stress on a plurality of optical fibers, wherein the first layer reduces micro bend losses on the plurality of optical fibers.

8. The buffer tube as claimed in claim 1, wherein the first layer of the buffer tube is characterized by thickness, wherein thickness of the first layer is in a range of 0.1 millimetre to 0.4 millimetre.

9. The buffer tube as claimed in claim 1, wherein the crush resistance of 700 Newton per 10 centimetres sustains compressive tension and stress on the optical fiber cable.

10. The buffer tube as claimed in claim 1, wherein the second layer of the buffer tube is characterized by thickness in a range of 0.2 millimetre to 0.5 millimetre.

11. A buffer tube for an optical fiber cable, comprising:
    a first layer, wherein the first layer is an inner layer of the buffer tube, wherein shore hardness of the first layer is in a range of 20 shore D to 40 shore D; and
    a second layer, wherein the second layer is an outer layer of the buffer tube, wherein the second layer surrounds the first layer, wherein shore hardness of the second layer is in a range of 40 shore D to 80 shore D,
    an optical fiber ribbon stack, wherein the optical fiber ribbon stack is packed inside the buffer tube, wherein the optical fiber ribbon stack comprises a plurality of optical fiber ribbons, wherein each of the optical fiber ribbons of the optical fiber ribbon stack comprises a plurality of optical fibers.

12. The buffer tube as claimed in claim 11, wherein the first layer is made of a soft material, wherein the soft material of the first layer is one of low smoke zero halogen, thermoplastic elastomers and thermoplastic polyurethane.

13. The buffer tube as claimed in claim 11, wherein the second layer is made of a hard material, wherein the hard material of the second layer is one of polypropylene, polybutylene terephthalate, and nylon.

14. The buffer tube as claimed in claim 11, wherein the first layer of the buffer tube is characterized by thickness, wherein thickness of the first layer is in a range of 0.1 millimetre to 0.4 millimetre.

15. The buffer tube as claimed in claim 11, wherein the second layer is characterized by crush resistance of 700 Newton per 10 centimetres.

16. The buffer tube as claimed in claim 11, wherein the second layer of the buffer tube is characterized by thickness in a range of 0.2 millimetre to 0.5 millimetre.

* * * * *